United States Patent [19]
Shoji et al.

[11] Patent Number: 5,903,890
[45] Date of Patent: *May 11, 1999

[54] DATABASE SYSTEMS HAVING SINGLE-ASSOCIATION STRUCTURES

[75] Inventors: Wataru Shoji; Daisuke Tabuchi; Ichiro Nakajima, all of Tokyo, Japan

[73] Assignee: Sofmap Future Design, Inc., Tokyo, Japan

[*] Notice: This patent is subject to a terminal disclaimer.

[21] Appl. No.: 09/079,686

[22] Filed: May 15, 1998

Related U.S. Application Data

[63] Continuation of application No. 08/611,293, Mar. 5, 1996, abandoned.

[51] Int. Cl.⁶ .................................................. G06F 17/30
[52] U.S. Cl. ........................... 707/3; 707/6; 395/200.47; 395/590
[58] Field of Search ............................ 395/200.47, 827; 395/590; 707/6, 3

[56] References Cited

U.S. PATENT DOCUMENTS

| | | | |
|---|---|---|---|
| 4,570,111 | 2/1986 | Crosby, Jr. et al. | 388/806 |
| 5,128,871 | 7/1992 | Schmitz | 364/490 |
| 5,321,843 | 6/1994 | Shoji et al. | 707/3 |
| 5,475,836 | 12/1995 | Harris et al. | 395/681 |
| 5,519,859 | 5/1996 | Grace | 707/3 |
| 5,560,005 | 9/1996 | Hoover et al. | 707/10 |
| 5,572,732 | 11/1996 | Fant et al. | 395/701 |
| 5,577,189 | 11/1996 | Gay et al. | 395/326 |
| 5,745,785 | 4/1998 | Shoji et al. | 395/827 |
| 5,764,908 | 6/1998 | Shoji et al. | 395/200.47 |
| 5,781,900 | 7/1998 | Shoji et al. | 707/6 |
| 5,799,181 | 8/1998 | Tabuchi et al. | 395/590 |

FOREIGN PATENT DOCUMENTS

| | | |
|---|---|---|
| 0 550 368 A2 | 7/1993 | European Pat. Off. . |
| 0 690 398 A1 | 1/1996 | European Pat. Off. . |
| WO 90/08360 | 7/1990 | WIPO . |

OTHER PUBLICATIONS

Shoji et al., "The Latest Map Information Processing System Using a Personal Computer: Super Scroll WID" (English Translation), Pixel, 1998, pp. 170–175.

Ishihara et al. "Modeling and Evaluation of Broadband Access Networks for Multimedia Services", Community Networking Integrated Multimedia Service, 1994 Workshop (1st) pp. 117–125.

Primary Examiner—Thomas G. Black
Assistant Examiner—Charles L. Rones
Attorney, Agent, or Firm—H. C. Chan

[57] ABSTRACT

A database system can be formed by combining a plurality of single-association databases each associated with a database driver. A single-association database contains a plurality of records, and each record associates one piece of data with another piece of data. Each database driver contains a parameter file and is designed to perform searches on its associated database. Each database driver also contains means for sending a command to the parameter file of another database driver. The recipient database driver executes the command without returning result of execution to the sending database driver. The database system also contains a software module for interacting with the database drivers to achieve a desired search result.

13 Claims, 11 Drawing Sheets

DATABASE SYSTEMS HAVING SINGLE-ASSOCIATION STRUCTURES

This application is a continuation of Application Ser. No. 08/611,293 filed Mar. 5, 1996 now abandoned.

FIELD OF THE INVENTION

The present invention relates to database systems, and more particularly relates to database systems in which data is organized in a plurality of single-association structures.

BACKGROUND OF THE INVENTION

Databases are among the most important assets of a company. Examples of databases are customer records (e.g., name, address, phone number, credit card number, etc.), accounting data (e.g., account receivable and account payable), and mailing lists (for soliciting new customers). A company would plunge into financial crisis if its databases are destroyed. For example, the company will not be able to collect its bills if its account receivable files are erased. Thus, the value of the databases of a company could be higher than the value of its tangible assets.

A database is a collection of data organized in a predetermined manner. Typically, the data is arranged into a plurality of records having identical structure. Each record contains one or more fields (e.g., name, address, and phone numbers) for holding appropriate data. In order to retrieve data quickly, a database is typically associated with an index which contains a table of keys representing every record in the database. The keys typically correspond to the data in a predetermined field (e.g., name) of the records. The keys are arranged in a user-defined criterion (e.g., ascending or descending alphabetical order). Generally, records are stored in the database in the order they are entered. In most cases, records are entered without any particular order, and can be considered random. However, the index is re-arranged in accordance with the criterion every time when one or a set of records are entered. When it is desirable to locate a record, the index is searched first. Because the index is well-organized, the search time is very short. The correct record can be easily found based on the information obtained from the search result. If the index is not used, the entire database (which could be many times the size of the index) needs to be searched.

The sizes of these databases are typically very big (several million bytes). The number of rows and columns are very large. There could be many indexes associated with a database. Further, the search "engines" are very complex because they have to handle the huge databases and work with all the indexes. As a result, even in the age of personal computers, these databases are best handled by mainframe computers.

There are "free-form" databases in which the data is not organized in any predetermined manner while allowing every words in the database to be searched. This type of databases are often used by on-line information providers (such as DIALOG™ DOW JONES™ WESTLAW™ and LEXIS™ which provide full-text searching capability to newspapers, magazies, court decisions, etc. In this type of databases, all the words in the text are indexed. The "free-form" databases allow for efficient retrieval of data, but is typically not flexible and very inefficient in utilizing computer resources (e.g., the index files are typically very large).

Thus, there is a need to design a simple, fast, flexible and efficient database system.

SUMMARY OF THE INVENTION

The present invention involves a novel database system comprising a plurality of single-association databases each associated with a database driver. A single-association database contains a plurality of records, each record associates one piece of data with another piece of data. One implementation of the single-association database is an ASCII file containing many lines, each line associate one set of ASCII characters with another set of ASCII characters. An example of such a file is:

A111=John
A123=Peter
B111=Mary

In this example, the symbol "=" is an association symbol, and the set of ASCII characters to the left of the "=" sign (e.g., "A111") is associated with the set of characters to the right of the "=" sign (e.g., "John").

The database driver is a software routine optiniized for searching information in its associated database. As a result, the size of the driver is small and the search speed is fast. Further, the plurality of single-association databases can be combined in a variety of ways so that complicated searches can be easily conducted. These combinations give rise to a very flexible database system.

The present database system does not need to have index files. The structure of each database in the present system is often simpler than an index file of a conventional database system. As a result, there is no need to construct an index file to speed up searching. The lack of index files is another advantage of the present database system.

In this database system, all the database drivers and their associated databases are hierarchically equal. Architecturally, these drivers and databases are independent of each other. Adding more databases will not increase the complexity of the system, although the information contained in the database system increases. As a result, the size of the present database system can be increased without penalizing its performance.

The database system of the present invention can be easily implemented on a network (both local and wide area). The databases and the drivers could reside on different computers of a network. A computer can combine its existing databases and drivers with the databases and drivers downloaded from other computers so as to build a desired database system comprising a plurality of single-association databases.

The database system of the present invention can be implemented using a novel bossless computer program architecture (called "digital cell technology") comprising a plurality of program modules called "cells." Under this architecture, each cell is hierarchically equal, i.e., there is no controlling (or boss) cell. An application can start from any cell, and can terminate at any cell. Typically, many cells are executing either sequentially or concurrently. Various applications can be designed by controlling the operation of these cells. As explained above, the database system of the present invention comprises a plurality of database drivers which are hierarchically equal. This structure is compatible with the digital cell technology. In this embodiment, the database and interface drivers could be implemented as cells.

Each cell is associated with a file, called a DNA file. The characteristics and operation of the cells are determined by their associated DNA files. Cells communicate by writing statements to the DNA files associated with other cells using a protocol called digital shifting function (DSF). Once written, the origin of these DSF statements is ignored. There is no need to "return" to the cells which originate the statements. Further, the DSF statements are executed by the cells without regard to their origins.

The cells execute statements in their associated DNA files. These statements are executed sequentially. The cells retain full control of the execution, i.e., there is no need to turn over execution to other cells during or after the execution of statements. There is no need to report to other cells on the status or results of execution.

The digital cell technology does not require the preservation of linkage information because there is no need for the cells to return information or control to other cells. This technology is flexible because each cell is hierarchically at the same level as other cells, thus can be selected to perform a certain task based only on its ability instead of on its hierarchic level. For example, when there is no need for a cell to exist, it can be removed from an application. On the other hand, program modules in conventional boss architecture cannot be removed arbitrarily. For example, the main program cannot be removed, even if it is not performing any useful function.

In one embodiment of the database system, the single-association databases could be embedded in the DNA files of the associated database drivers. In this way, the database drivers are integrated with their associated databases. Some of the statements executable by the database drivers relate to searching of their associated databases. Thus, other cells can request a database driver to search its associated database by sending a search statement to the DNA file of the database driver. The requesting cells can also specify the destination of the search result. The destination could be the requesting cell's own DNA file, the driver cell's DNA file, or an independent file. Thus, the present database system can be easily designed to interact with non-database related cells. This level of flexibility allows more efficient and powerful database systems to be designed.

In applications formed by a plurality of cells (including database drivers, requesting cells and other cells), each cell is at the same level as the other cells. Thus, each database driver and requesting cell can execute its designed functions independent of each other and can interact with any other cells it desires. Each cell can issue statements to another cells without going through a chain of cells. The mode of interaction of the present invention is direct (i.e., from one cell to another directly instead of through a chain of modules). As a result, the structure of an application is simple and the execution speed is fast.

These and other features and advantages can be understood from the following detailed description of the invention together with the accompanying drawings.

DETAILED DESCRIPTION OF THE INVENTION

The present invention is directed to a novel database system. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
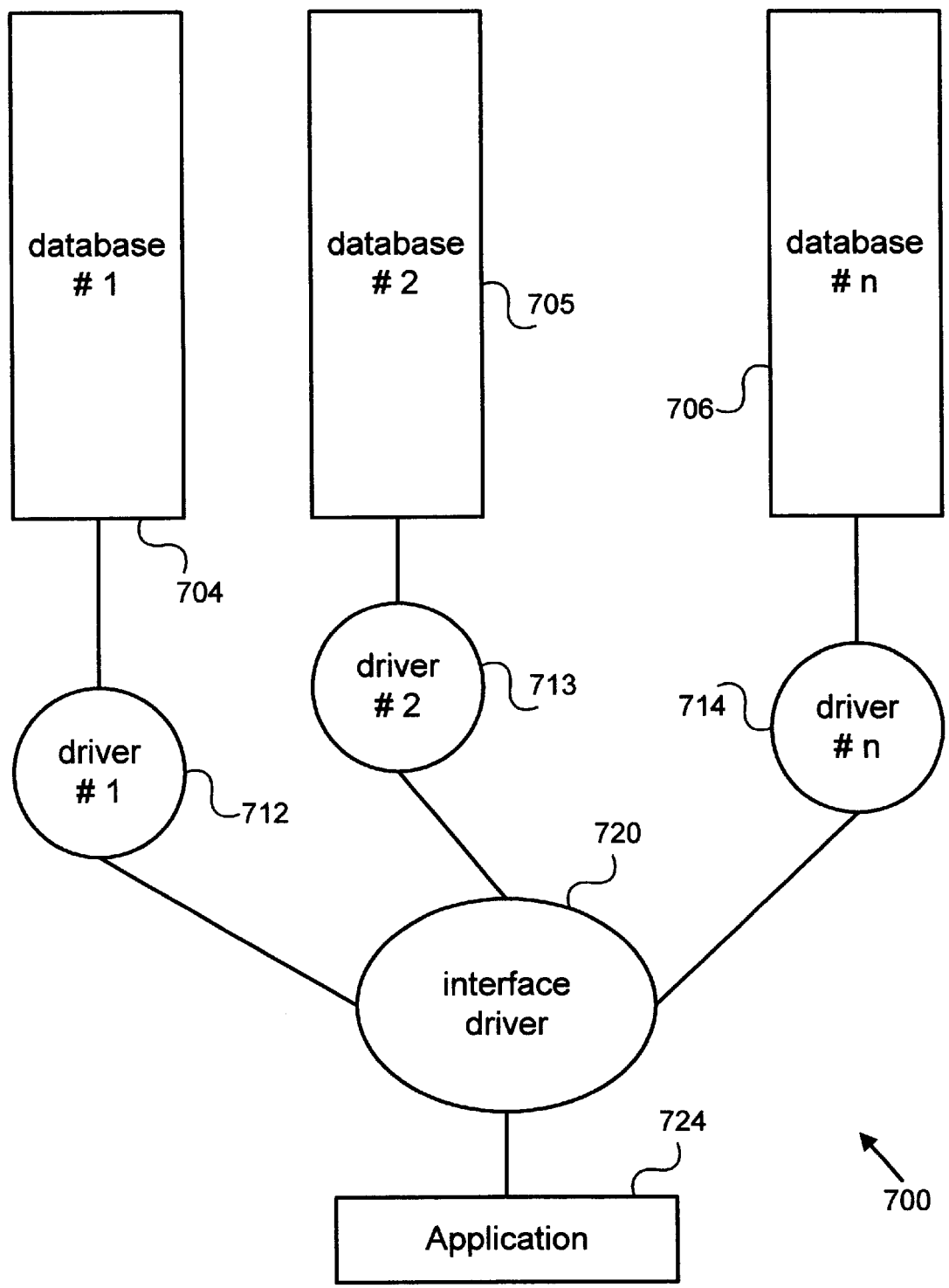
FIG. 1 is a schematic diagram of a database system of the present invention.

FIG. 1 is a schematic drawing of a database system 700 of the present invention. Database system 700 contains a plurality of single-association databases, such as databases 704–706. One way to picture a single-association database is a table having many rows and two columns. The two columns in each row associate one set of data with another set of data. The data could be text, numbers, graphic, audio and video data. In an example involving a library database system used to keep track of all books in a library, the first column of database 704 could be the identification (ID) number of all books in the library while the second column could be the year of publication of each book. Thus, database 704 shows a single association between a pair of data. This is different from conventional database wherein each record contains many fields, thereby associating the data in one field with the data in many fields.

In order to be useful, many single-association databases are needed in system 700. Thus, another database (e.g., database 705) may associate the ID with the authors of the books while a third database (e.g., database 706) may associate the ID to the names of the persons who are borrowing the books. It is possible for the first column of the databases in system 700 to be different. For example, the first column of one of the databases in the above example may be the title of the books instead of the ID number. However, if it is desirable to in this database to the other databases, there is a need to have a database which link the ID to the title of the books.

Each database is associated with a database driver. The main function of the database driver is to perform searches on its associated database and return the results of the searches to an appropriate file. The database driver could also perform other functions on its associated database, such as editing the records in the database. In FIG. 1, databases 704–706 are associated with drivers 712–714, respectively.

In a conventional database system, a single driver (i.e., search routine) is associated with all the complex databases in the system. Thus, if a database system contains ten separate databases, the same driver would be used to perform search on the ten databases. Because the driver needs to handle all the requirements of a large number of complex databases, the size of the driver becomes very large. This is different from the database system of the present invention in which each driver is specially designed to operate on its associated database.

Figure 2A:
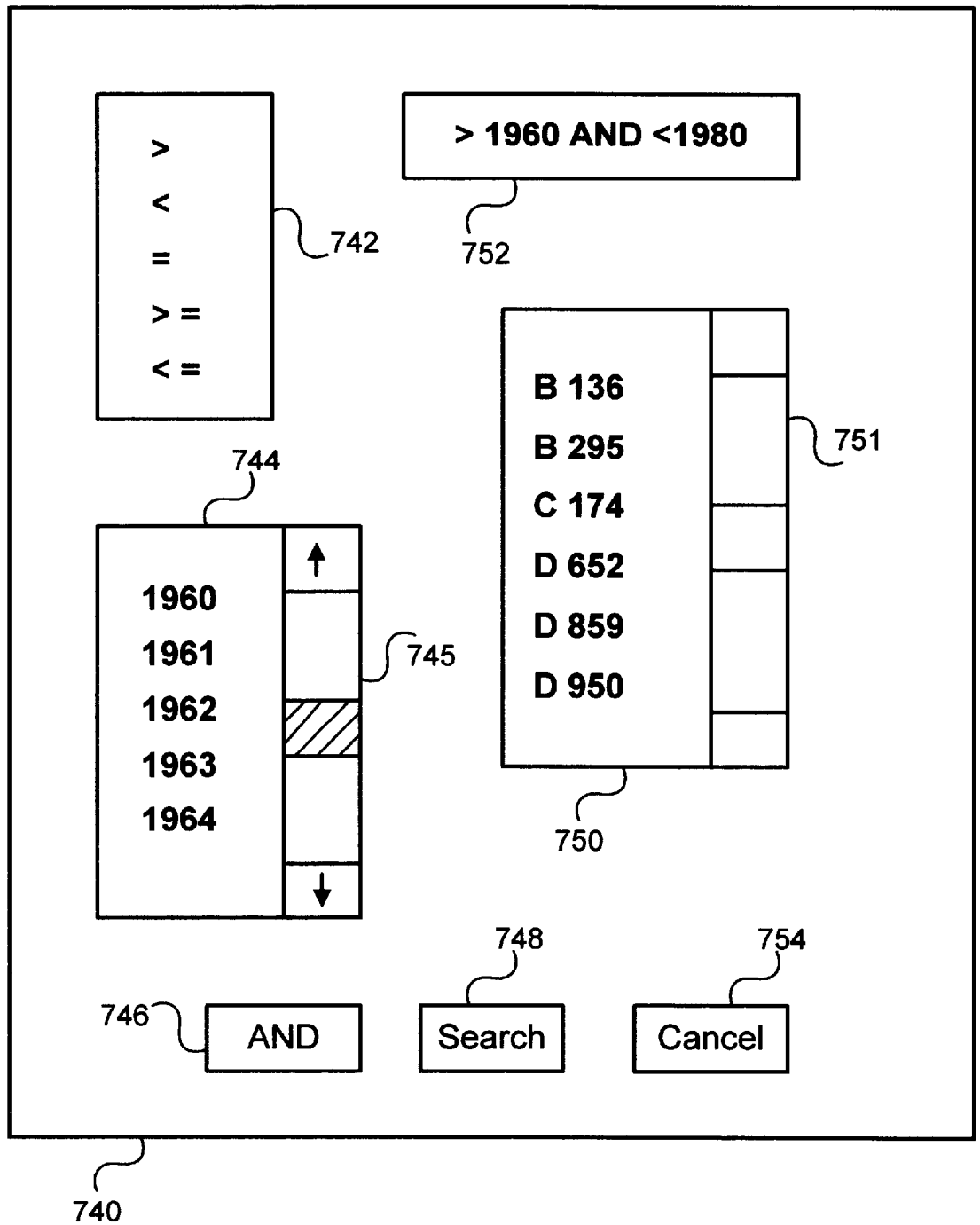
FIG. 2A is an exemplary graphic display of a database driver of the present invention.

FIG. 2A shows an exemplary graphic display 740 optionally associated with database driver 712. The underlying database 704 provides the relationship between the ID number and the year of publication of books in the above-mentioned library. Display 740 contains a window 742 allowing a user to enter a relationship. In FIG. 2A, the relationships are greater than (>), less than (<) equal to (=), greater than or equal to (>=), and less than or equal to (<=). It should be appreciated that other relationship can be included. Display 740 also contains a window 744 showing the set of possible data in the column (in this case, all the years within a range). Window 744 contains a scroll bar 745 allowing the user to scroll through all the available years. The user can define a search criterion by clicking on a relationship (e.g., greater than) in window 742 and a year (e.g., 1960) in window 744. If it is desirable to define a range, display 740 provides an "AND" button 746 for defining an AND relationship. Thus, the user can click on AND button 746, and then select another relationship (e.g., less than) in window 742 and a year (e.g., 1980) in window 744. The user can then click on a SEARCH button 748 to execute the search. The result of the search is display on a window 750. Window 750 contains a scroll bar 751 allowing the user to review all the books which meet the selection criterion.

To make the display more user friendly, display 700 may contain a window 752 showing the search criterion. Display 740 may contain other buttons, such as a CANCEL button 754 or a button for forming an "OR" operation (or other logic variations) of the search relationships. For example, if the user wishes to search for books which are published in 1960 and 1980, the user can define the search relationship (using the above described windows) and then click on the "OR" button.

Typically, an application needs to perform a search on more than one databases. For example, the application may like to search for all books published by a certain publisher between 1960 and 1970. This search would involve (i) a search on a database associating the ID with the publishers and (ii) a search on a database associating the ID with the years of publication. The results of the two searches are then "ANDed" together.

Returning now to FIG. 1, an interface driver 720 is used to manage searches on multiple databases. One of the functions of an interface routine 720 is to allow an application 724 to specify the databases to be searched and the search criteria.

Figure 2B:
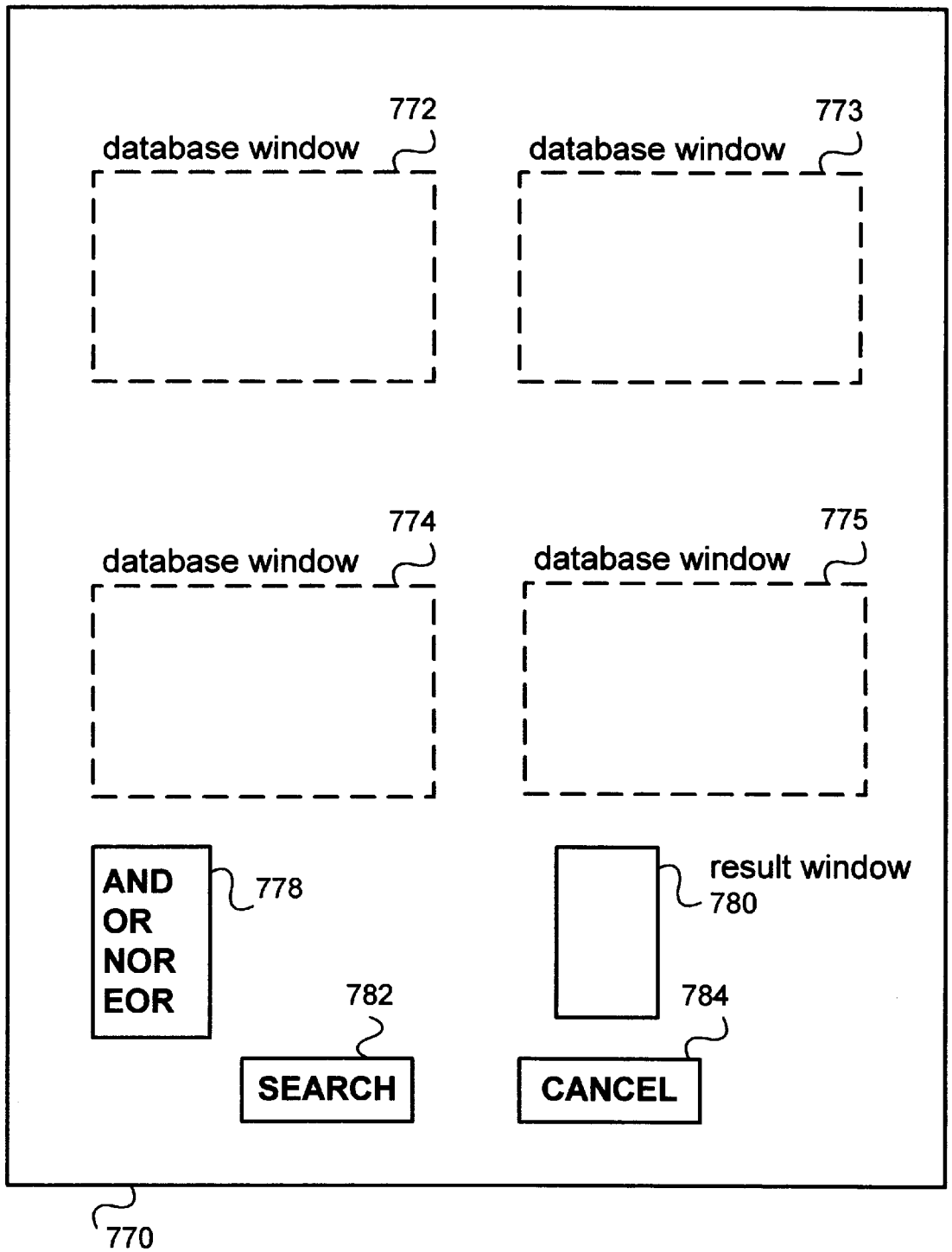
FIG. 2B is an exemplar graphic display of an interface driver of the present invention.

FIG. 2B shows an exemplary display 770 optionally associated with interface driver 720. Display 770 contains a plurality of windows (such as windows 772–775), one for displaying information relating to a selected database. Each one of windows 772–775 has a similar structure as display 740 of FIG. 2A, and consequently will not be shown in detail. The user can select search criteria in each window using the methods described above. The result of the search for each database is displayed in the corresponding window. The user can then click on one of the logic relationships shown in a window 778 to select a search for the results of all the databases. A click on a SEARCH window 782 starts the search. The final result is displayed on a result window 780. For example, if the "AND" row in window 778 is selected, window 780 would show the AND of the search results in windows 772–775.

Display 770 may contain other buttons, such as a CANCEL button 784.

The present invention is different from prior art database systems which contain a small number of multi-association databases and a search routine. Typically, the structures of the prior art databases are very complex because each database is designed to contain as much information as possible. As a result, the search routine is also very complex because it has to understand the complicated structure of the underlying database. Consequently, the databases and search routine are very difficult to use and maintain.

The database system of the present invention is especially useful in a distributed environment over a local or wide area network. These networks comprise a plurality of computers. Some of the computers can be used to develop databases and associated drivers of the present invention. Other computers can download and use these databases. An example of a wide-area network is the Internet.

Figure 3:
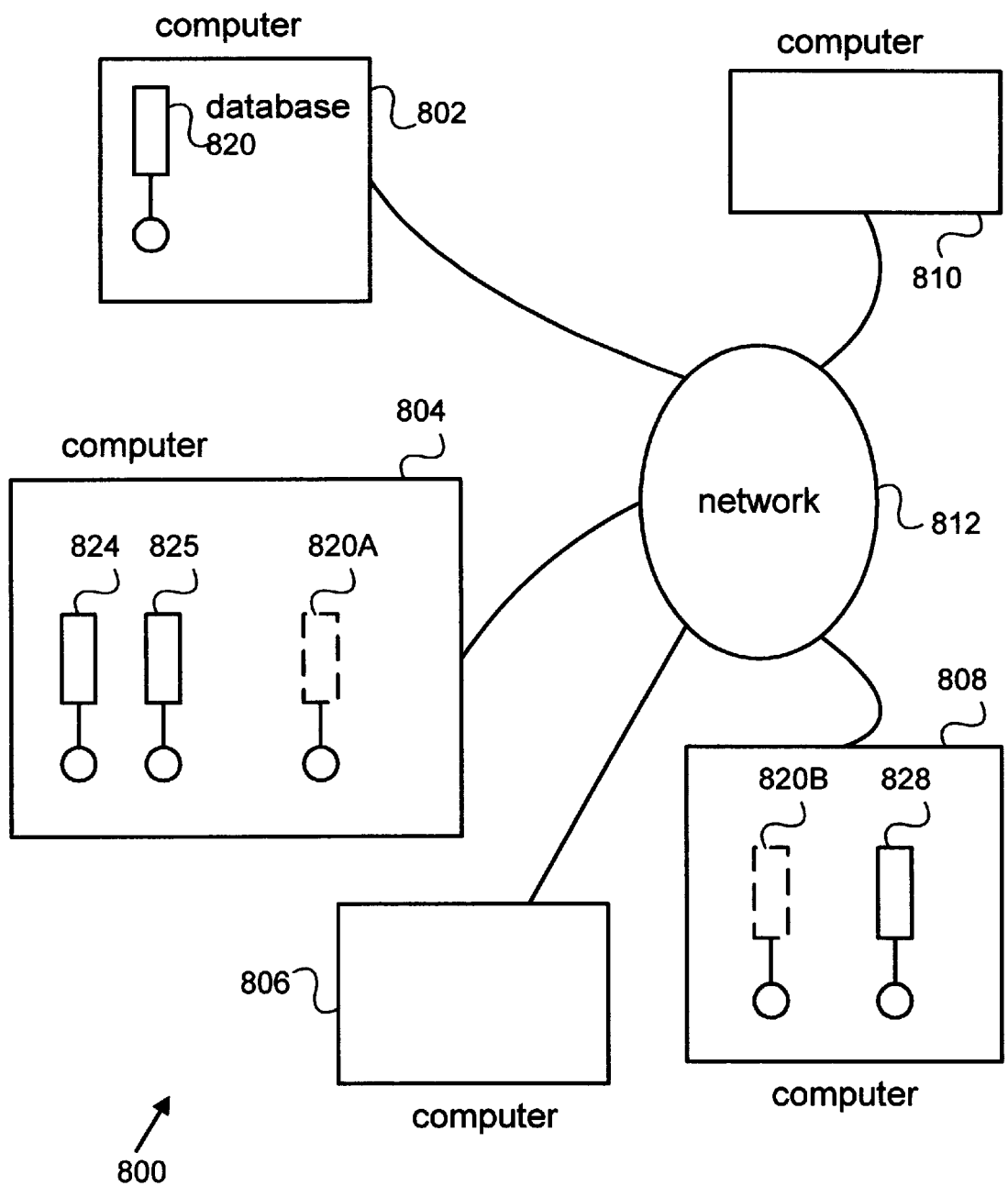
FIG. 3 is a schematic diagram of the database system of the present invention implemented on a network system.

FIG. 3 is a schematic diagram showing a network system 800 of the present invention. System 800 comprises a plurality of computers 802, 804, 806, 808 and 810. These computers are coupled to a network 812, which could be a local or wide area network. A database (and its associated driver) 820 has been developed by and is stored in computer 802. Two databases 824 and 825 reside in computer 804. Computer 804 can download database 820 from computer 802 using a conventional network protocol. The downloaded database 820A is shown in FIG. 3 as dashed lines. Applications in computer 804 can now use all three databases, including 820A downloaded from computer 802. Similarly, computer 808 can download database 820 from computer 802 using a conventional network protocol. The downloaded database 820B is shown in FIG. 3 as dashed lines. Applications in computer 808 can now use an existing database 828 and database 820B downloaded from computer 802.

It should be noted that a database and its associated driver could reside on different computers on the network. For example, a database could reside on computer 806 while its associated driver could reside on computer 810. A computer wishing to use the database needs to download the database and the associated driver from computers 806 and 810.

Because the structure of the databases and drivers of the present invention could be very simple, even low performance personal computers and relatively unskilled users could design valuable databases. These databases and drivers can be easily downloaded and used by other computers in the network. Further, only those databases and drivers that are actually used by a computer need to be downloaded, thereby reducing traffic on the network. On the other hand, designing conventional databases is a complex task that can be handled only by experienced database designers using powerful computers. Transferring a conventional database on a network requires considerable bandwidth because the size of a conventional database is typically very large.

The database system of the present invention contains single-association databases and related drivers. The databases are very flexible, and can be changed and added easily. The drivers are designed to work with their associated database. Because the underlying databases have a simple structure, the drivers also have a simple structure and can be designed very efficiently.

Implementation of the Single-Association Database Using Digital Cell Technology

One aspect of the database system of the present invention is to reduce the underlying structure to a simple form. This aspect is compatible with a new computer software architecture called "digital cell technology." As a result, the database of the present invention can best be implemented using the digital cell technology. A detailed description of this technology has been disclosed in U.S. Pat. No. 5,799, 181 filed Oct. 5, 1995, issued on Aug. 25, 1998, and entitled "Bossless Architecture and Digital Cell Technology for Computer Programs." This copending patent application is hereby incorporated by reference.

An implementation of the present inventive database system using digital cell technology is now described. One characteristic of the digital cell technology is that it is a "bossless" architecture because every program module (or cell) is on equal footing with other program modules. There is no module that controls the overall operation of the program (i.e., no boss). A comparison of the convention boss architecture (FIGS. 4A and 43) and the bossless architecture (FIG. 4C) is shown below.

Figure 4A:
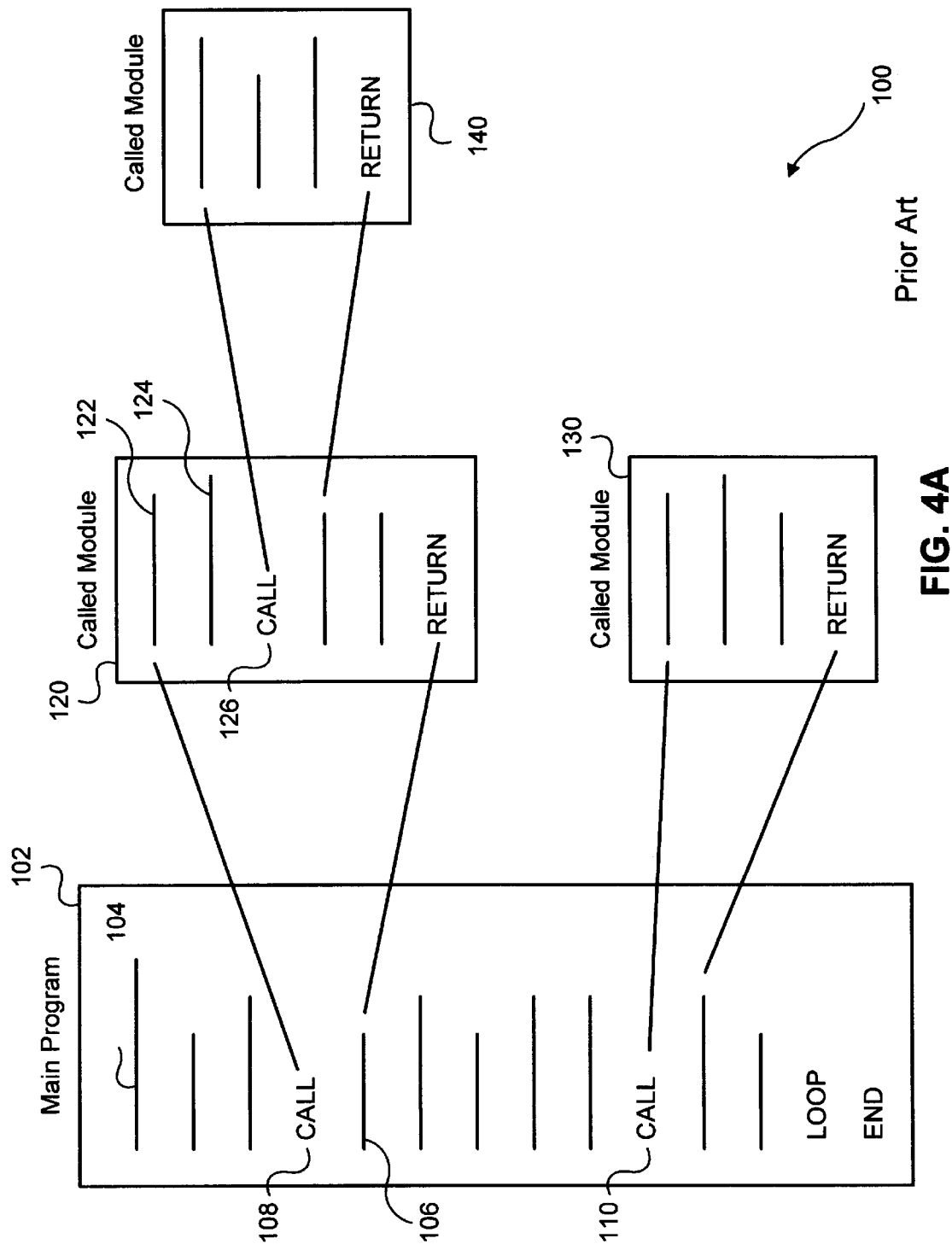
FIGS. 4A and 4B (prior art) are schematic diagrams of a conventional computer program architecture.

FIG. 4A is a schematic diagram of a program 100 having such an architecture. In FIG. 4A, a main program 102 contains a plurality of statements, such as 104 and 106. Some of the statements could be CALL statements, such as statements 108 and 110. These two CALL statements, when executed, will invoke program modules 120 and 130. Main program 102 may contain a LOOP statement which causes main program 102 to execute continuously in a loop. Main program 102 also contains a STOP statement for terminating the program. It should be appreciated that program 100 could be written in different program languages, and the precise syntax of the statements and program structure could vary with the programming languages.

Program 100 contains a plurality of program modules, such as modules 120 and 130, called by main program 102. Module 120 contains a plurality of statements, such as statements 122 and 124. It could also contain a plurality of CALL statements, such as statement 126. This statement, when executed, will invoke another module 140. Finally, module 120 contains a RETURN statement.

When CALL statement 108 is executed, main program 102 jumps to module 120. Statements 122, 124 and the rest of the program are executed. Upon executing the RETURN statement in module 120, program 100 returns to statement 106, which is the statement following. CALL statement 108. At is time, the control of program 100 is returned to main program 102. Main program 102 continues to execute.

The structure of all the modules is similar to that of module 120. Similarly, the jump-return mechanism, described above, is carried out by an the CALL statements in program 100. Consequently, they will not be further described in this specification.

In order to carry out this jump-return mechanism, the return addresses of the CALL statements need to be saved in (typically in a memory structure called a stack). Other essential state information of the computer prior to jumping to the called module, such as values of registers, may also be saved if there is a need to do so (e.g., when jumping to an interrupt service routine). Thus, when main program 102 calls module 120, the contents of these registers may also be pushed (i.e., saved) in the stack. Similarly, when module 120 calls module 140, the return address of module 120 also needs to be saved. The contents of appropriate registers may need to be pushed in the stack. Thus, the size of the stack could be large when a large number of CALL statements are executed.

When a RETURN statement is executed, the return address is used to return to the calling program. The saved information is also retrieved.

Typically, a program in the above described conventional architecture contains many CALL statements and many modules. These modules could call other modules (e.g., module 120 can call module 140), thereby forming a chain of CALL statements. The precise history of this chain needs to be preserved so that the last called module can return to the main program. One of the problems of the conventional architecture is that the time to travel the chain could be very long. As pointed out above, each time a CALL statement is invoked, certain amount of state information needs to be saved, resulting in overhead in execution. Each time a RETURN statement is executed, the saved information needs to be restored, again requiring overhead in execution. As a result, the execution speed of programs written using conventional architecture is slow.

The following are some of the characteristics of the conventional architecture: (a) there is a controlling ("boss") program, e.g., main program 102, (b) all the linkage information (e.g., return address and registers) needs to be preserved when one part of the program (a calling program such as main program 102 or some of the modules) transfers execution to another (the called program), and (c) the linkage information is used to return control and information to the calling program. This architecture could be called a "boss" architecture. The calling module can be considered a master while the called module can be considered a slave executing commands issued by the master and then reporting results to the master.

Figure 4B:
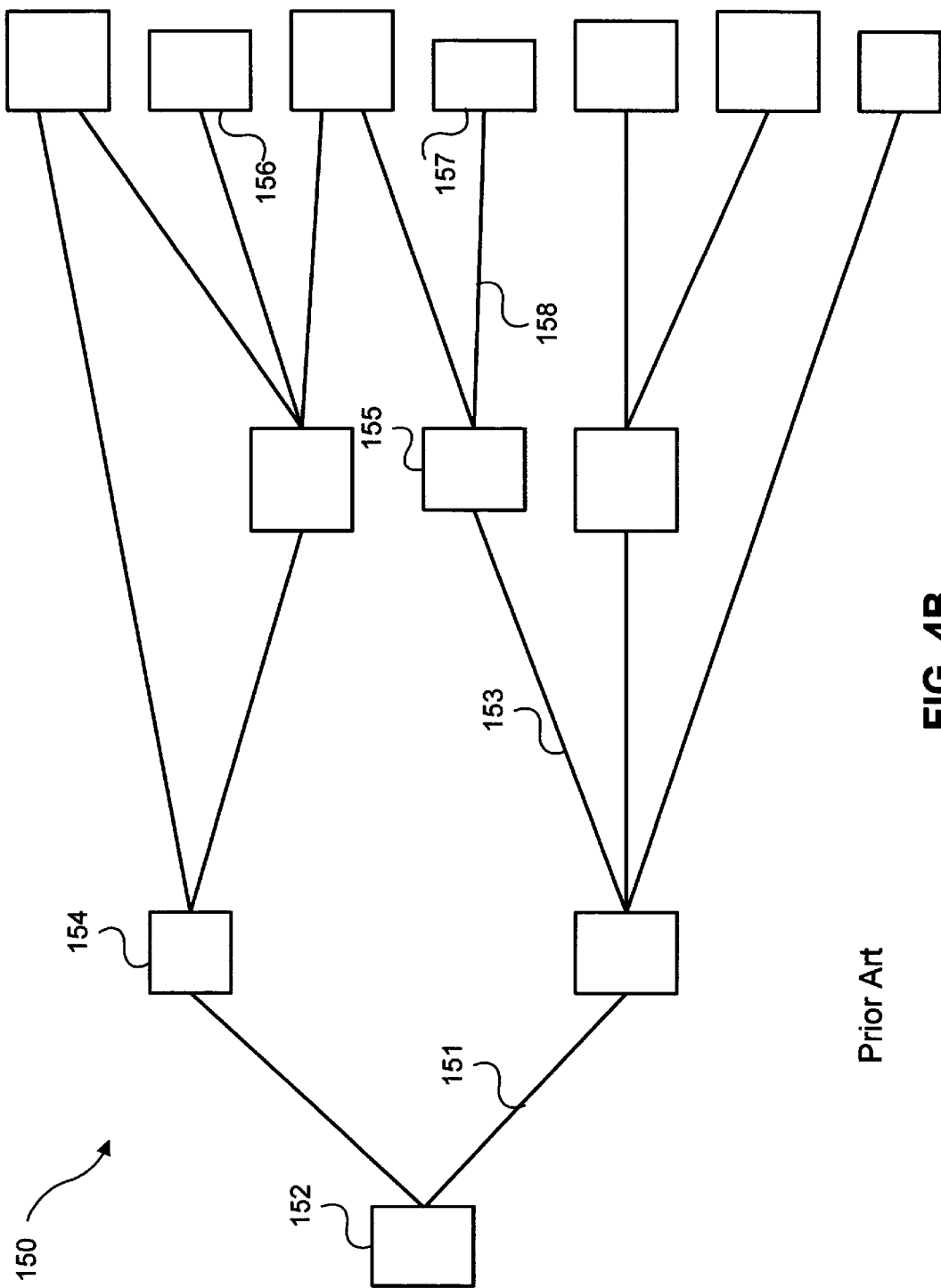

FIG. 4B is a schematic view of an application 150 based on the conventional boss architecture. The architecture is in the form of a hierarchic structure, and a boss module 152 controls a plurality of modules, such as modules 154–157. Solid lines running from the boss to the individual modules are used to graphically depict the chains of command and linkage. When a program module in the lowest level (i.e., module 157 at the end of a branch) is executing, solid lines (i.e., lines) 151, 153 and 158 from the boss to that program module must be maintained.

Figure 4C:
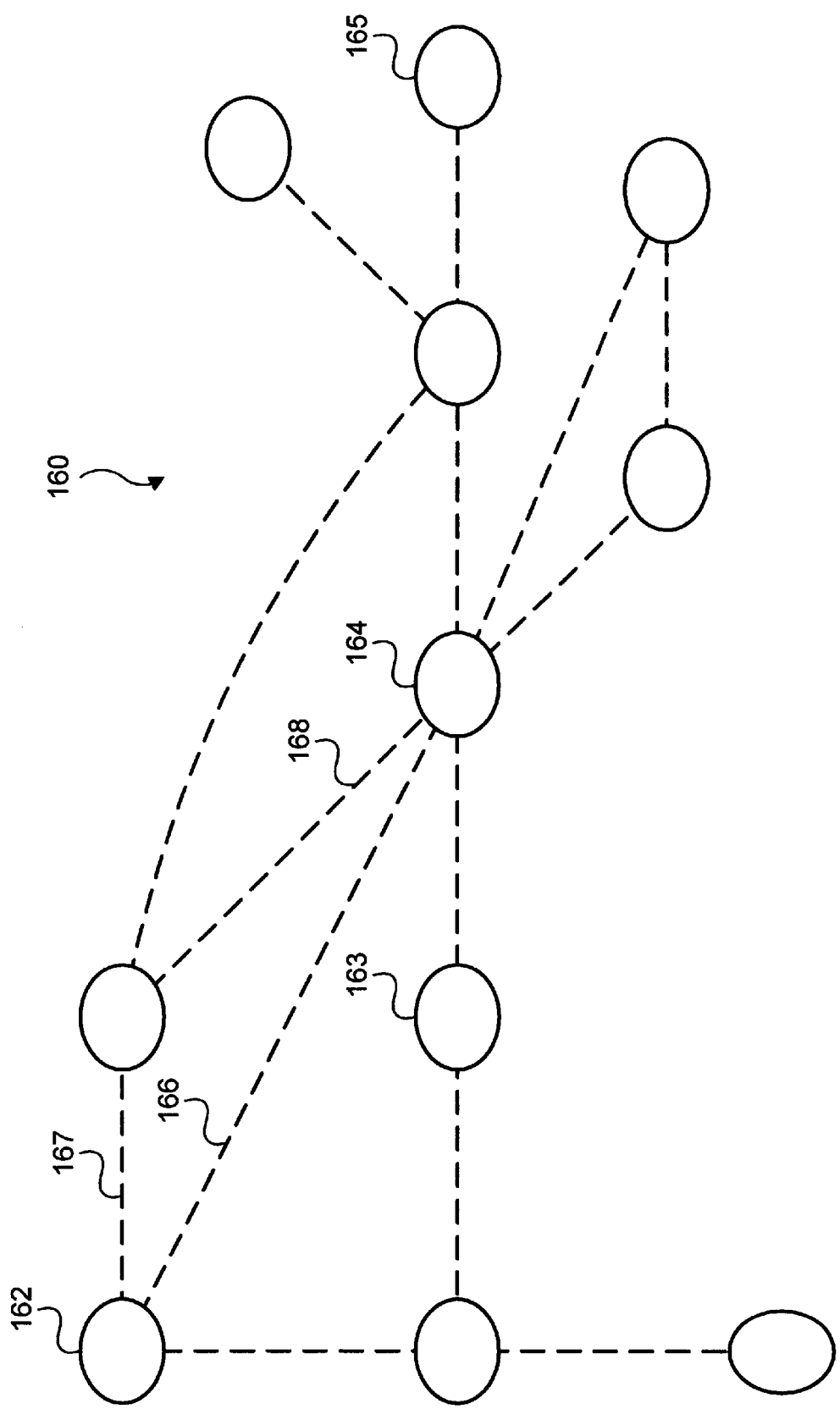
FIG. 4C is a schematic diagram of a "bossless" digital cell technology which can be used to implement the drivers of the present invention.

FIG. 4C is a schematic view of an application 160 based on the bossless architecture of the present invention. Application 160 comprises a plurality of program modules, such as modules 162–165. Each program module (called a "cell" in the present invention) is the same as the other cells in an hierarchical sense. Cells are linked together in a novel way in which no history or linkage information needs to be retained. Each link is independent. For example, there is no need for links to be active simultaneously. Each in is direct, i.e., two cells can be linked directly without the need of using one or more intermediate links. For example, cells 162 and 164 can be led directly using line 166 instead of using lines 167 and 168 and passing through an intermediate cell. An application can be formed by defining the cells involved and using the novel link of the present invention. This is different from the situation in FIG. 4A where the link from the boss to the module at the lowest level must be active at all time while the module is executing. In FIG. 4C, dashed lines are used to graphically depict the novel interaction of the present invention.

Figure 5:
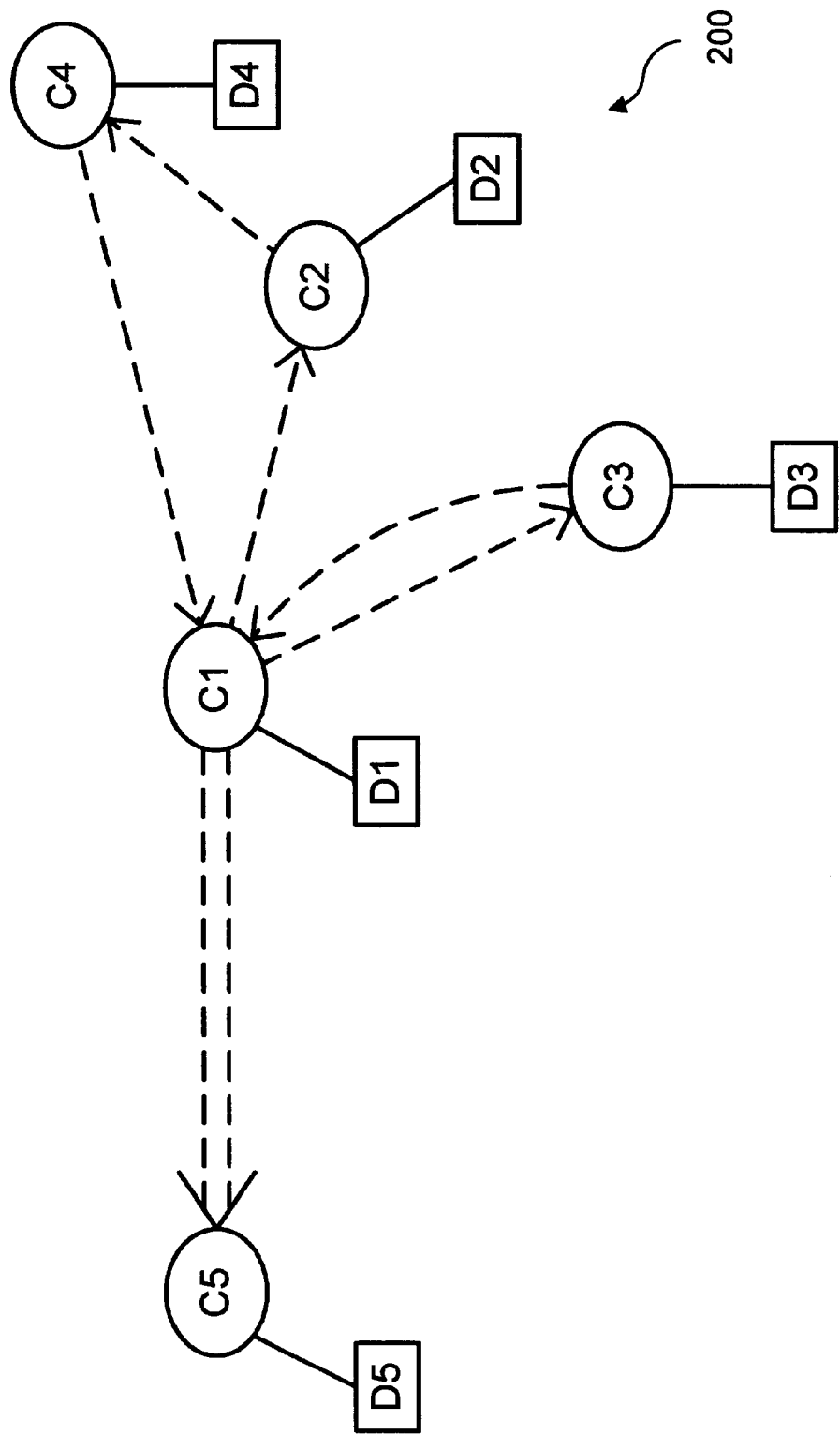
FIG. 5 is a drawing showing the structure of an application using the bossless architecture of the present invention.

FIG. 5 is a drawing showing the structure of an application 200 using the bossless architecture of the present invention. Application 200 contains a plurality of cells, labeled as C1–C4, loaded and executing in RAM. Each cell has an associated file (labeled as D1–D4), called DNA (Deoxyribo-Nucleic Acid) file, which contains information of the cell. The term "DNA" is used here in analogy with the biological relationship between a living cell and its DNA. At a desired time, cell C1 can send statements (called "DSF statements") to cell C2 using a protocol called digital shifting function ("DSF") protocol. Cell C2 will execute these statements. The detail structures of cells, DNA files and the DSF protocol will be described below.

One important distinction of the present invention form conventional inter-process communication is that cell C2 does not retain information on the origin of these statements, i.e., no history of the inter-process communication is kept. Thus, once cell C1 completes its writing of DSF statements to cell C2, there is no further linkage between cells C1 and C2. Cell C2 does not know the origin of these statements during their execution. It is possible for cell C1 to later establish communication with cell C2 again by sending another set of statements to C2. However, this communication is separate from the previous communication, and terminates once the new set of DSF statements is sent.

Each of the cells can send DSF statements to any of the cells it desires. Thus, cell C1 can also send statements to cell C3. Similarly, cell C2 can send statements to cell C4, which in turn can send statements to cell C1. Cell C3 can also send statements to cell C1.

In this example, cells C1 and C2 are not bosses to C4. For example, when C4 is executing DSF statements, there is no need to maintain any links between cells C1 and C2 and between cells C2 and C4. Cell C4 has no obligation to report results of execution to any cells in application 200. Links are maintained only during the time DSF statements are transferred. Further, the writing of statements by cell C1 to cell C2 could be independent of the writing of statements by cell C2 to cell C4. In addition, cell C4 merely execute statements, and does not care where the statements come from. In FIG. 5, dashed lines are used to graphically depict the novel relationship between cells.

As pointed out above, one of the problems of the conventional architecture is that excessive amount of linkage information is retained, thereby slowing down the execution of programs. In the architecture of the present invention, there is no need to save and restore register values on a stack when cell C2 executes statements written by cell C1. There is no need to register cells in a central database prior to sending commands. There is no need to send messages back and forth to report status of execution. As a result, the application can be executed quickly.

Because there is practically no overhead in linking programs, it is possible to design an application using a large number of small cells. In a preferred embodiment, the size of the cells are small. The function of each cell is well defined and focused. As a result, there is flexibility in designing applications and the efficiency in execution improves.

This feature of the digital cell technology is especially advantageous in implementing the database system of the present invention. As explained above, the present database system contains a plurality of database drivers designed to serve their associated databases. These drivers are implemented as cells. Because there is no overhead in linking, the database system can support a large number of drivers without affecting the performance of the system. As a result, the digital cell technology provides an efficient platform to support the database system of the present invention. These two inventive technologies (digital cell and single-association database technologies) form a synergical combination that can out perform conventional database systems.

A cell can also invoke another cell (e.g., cell C1 can invoke cell C5, as indicated by the double dashed line), if that cell is not already loaded and running in RAM. The invoked cell (i.e., cell C5) could be completely independent of the invoking cell (i.e., cell C1) after invocation. Thus, the invoking cell is not the boss of the invoked cell and the two cells are hierarchically at the same level. This is completely different from the prior art in which an invoking program module is at a hierarchical different level as the invoked program module.

As explained below, a cell can be implemented as an "EXE" file (in the MS DOS or MS WINDOWS™ environment), and can be invoked by loading into for execution using well known methods in accordance with the operating environment. The cell's associated DNA file can also be loaded into RAM. The invoked cell takes on the attributes stored in its DNA cell. It is also possible to modify the DNA file when the cell is invoked or while running by writing to the file (which could be an ASCII file). As a result, the architecture provide a flexible approach to build applications.

It can be seen form FIG. 5 that the bossless architecture has a flat structure instead of a hierarchical architecture of FIGS. 4A and 43. Each of the cells C1–C4 is an independent executable routine which is at the same hierarchical level as other executable routines. No cell functions as a boss for other cells. Consequently, this architecture is called a bossless architecture.

This architecture allows an application to start at any cell. Other cells can be invoked as needed. This architecture also allows in application to end at any cell. Because there is no chain to unwind, the cells can terminate immediately. There is no need to return to the "boss" program before exiting the application. In one embodiment of the present invention, a cell can exit the application at a predetermined time after invocation of a new cell. In another embodiment of the present invention, other cells can send a DSF statement to this cell requesting it to terminate.

In the database system of the present invention, database drivers 712–714 and interface driver 720 can be implemented as cells. These cells can interact with other cells in the system in the manner described above. For examples database drivers 712–714 can receive "search" DSF statements from other cells for initiating a search on their associated databases.

The digital cell technology is especially suitable for a networked database environment described above in FIG. 3. The driver cells and the associated databases can be obtained from any source, including a remote computer in a network. Once downloaded to a local computer, they can interact with other cells in the local computer. The downloaded cells behave just like local cells.

It should be pointed out that the same database driver cell can run at different times, and access the same or different databases at each time. For example, cell A can access database number one at time one and access database number two at time two, and then return to database number one at time three.

Figure 6:
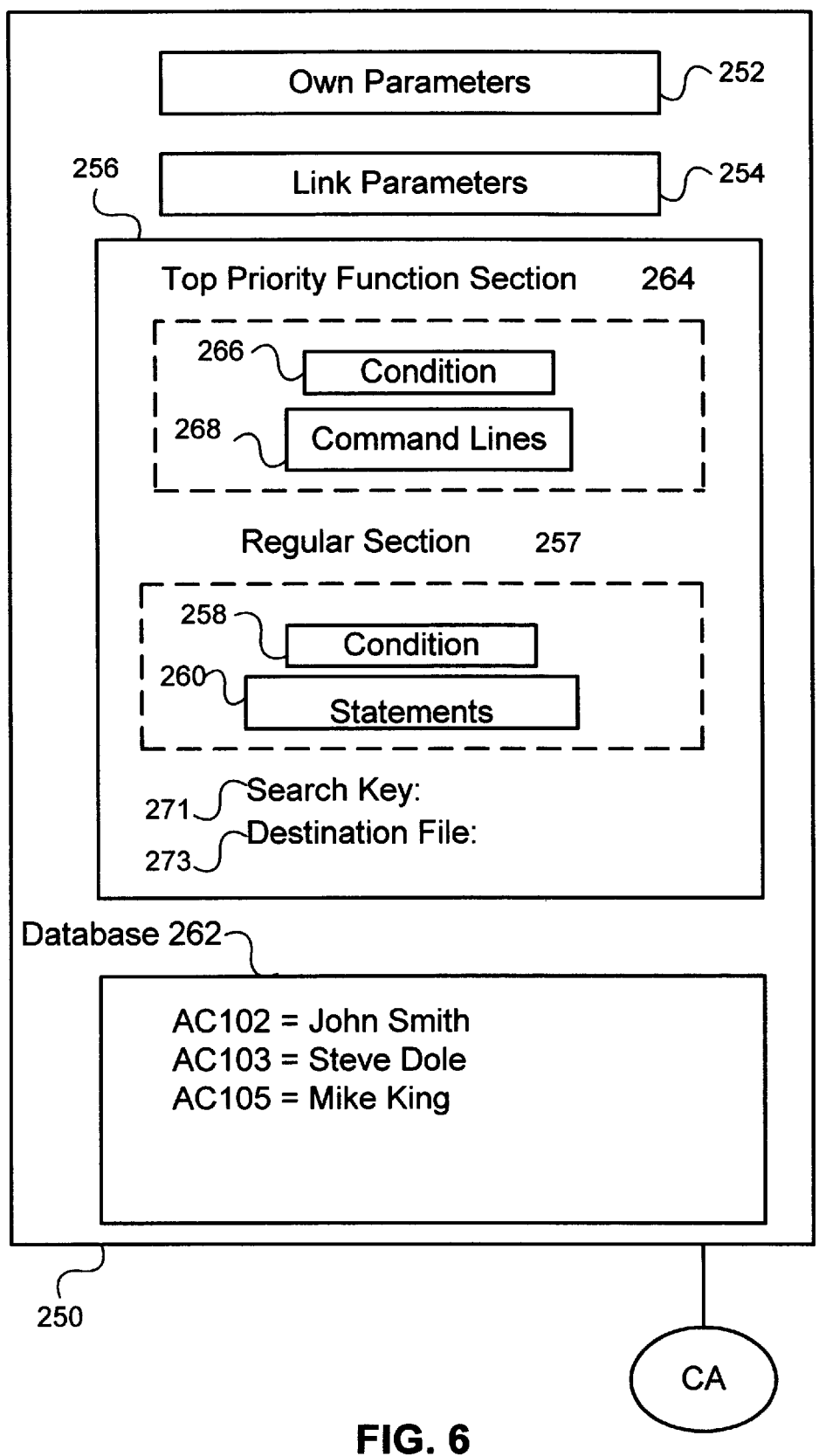
FIG. 6 is a block diagram showing the logical structure of a DNA file associated with a database driver cell of the present invention.

FIG. 6 is a block diagram showing the logic structure of a DNA file 250 associated with a cell, such as cell CA. File 250 has a section 252 containing parameters ("own parameters") related to the characteristics of cell CA itself. For example, section 252 may contain parameters related to the way cell CA manifest itself when invoked: the window size and background color of cell CA, the name of cell CA, the names of audio files associated with its invocation and termination, etc.

File 250 also contains a section 254 containing linking parameters ("link parameters") on cells related to cell CA. Examples of the parameters contained in this section are: the names, symbols and positions of the other cells. One of the parameter is "close," which is interpreted as closing cell CA when the cell associated with this parameter is invoked.

In one embodiment of the invention, the database of a database driver cell is stored in its associated DNA file. If cell CA is a database driver, file 250 contains a section 262 containing the associated database data. The length of this section could be very long, if the size of the database is large. In one embodiment of the present invention, the content of section 262 is of the form:

AC102=John Smith
AC103=Steve Dole
AC105=Mike King.

In this example, the symbol "=" is used to designate association. The data to the left of the equal sign (i.e., AC102, AC103 and AC105) are the ID number of the books while the data to the right of the equal sign are the name of the authors. These data could be coded in ASCII format. The number of lines is determined by the amount of information in the database.

It is possible that the database associated with cell CA be stored in other locations. In this case, file 250 contains a line which indicates the location of the associated database file.

File 250 further contains a DSF information section 256. This section contains a regular statements section 257 and a top priority function section 264. The structure of the regular section 257 and top priority function section 264 are substantially the same, except that top priority function section 264 has a higher priority in statement execution. These two sections contain individual headers for identifying the sections (e.g., each section headed by a different name or symbol).

Regular section 257 contains a "condition" section 258 and a statements section 260. Statements section 260 comprises DSF statements sent to cell CA by other cells. Statements in statements section 260 are executed sequentially. Examples of statements are "Draw Circle," "Draw Line," and "Scrolling." Each statement also contains parameters necessary for the execution of the statement (e.g., location and diameter of circles). Condition section 258 comprises three components: (a) a first pointer to the last DSF statement currently existing in statements section 260, (ii) a second pointer to the current DSF statement being processed by cell CA, and (iii) the current status of the cell. Examples of status are: ready, busy, lock, and never.

Top priority function section 264 contains a condition section 266 and a command lines section 269. The structure of condition section 266 is similar to the structure of condition section 258 (e.g., both sections contain two pointers). Command lines section 268 contains executable command lines which are sent by other cells using DSF (or similar) protocol. The command lines have a higher execution priority than the statements in statements section 260 (the details of execution priority will be discussed below in connection with FIG. 7). The command lines in command lines section 268 are executed sequentially. Examples of commands in section 268 are close, (for minimizing a window), max (for maximizing a window), restore, etc.

One statement (or command, if in top priority function section 264) which is specifically designed for database application is a "search" statement. This statement may contain various parameters, including a search criteria parameter and a destination file parameter (for indicating the location of the file which is used to store the results of the search). Alternatively, DSF information section 256 contains a "search key" section 271 (for accepting search criteria) and a "destination file" section 273. Other cells can write to these two sections as a part of a search request. The destination file could be the DNA file of the cell which requests the search, or the DNA file of the current database driver, or another file.

It should be appreciated that the logic structure shown in FIG. 6 can be implemented using one or more physical files.

Further, portions of the logical sections may intermingle physically. In one embodiment of the present invention, the DNA file is a text file. Thus, the content of the DNA file can be modified by using a regular text editor.

Statements sent by one cell to another follow the DSF protocol. A sending cell (e.g., cell CS) sets up a communication link with the DNA file 250 associated with cell CA. Specifically, it looks up the address of DNA file 250 and determines whether DNA file 250 is able to accept DSF statements (e.g., at a "ready" state) by examining its status in condition section 258. Statements will be issued by cell CS only when cell CA is ready to accept them. In one embodiment, the issuance of statements involves writing ASCII characters (e.g., the ASCII characters for "Draw Circle") to statements section 260 of DNA file 250.

When cell CS is authored to issue statements to cell CA, cell CS reads the first pointer (in condition section 258) to the last DSF statement to determine the appropriate address to write the DSF statements. It is important not to overwrite DSF statements already existed in cell CA Cell CS writes DSF statements to statements section 260 of DNA file 250. Cell CS also updates the first pointer in condition section 258 so as to point to the last DSF statement newly written into statements section 260. The communication link between cells CA and CA is terminated. It can be seen that cell CA and DNA file 250 do not maintain record (i.e., history) indicated that these new statements originate from cell CS.

It should be appreciated that the above described DSF protocol is only an exemplary protocol. Other protocol could be used to write DSF statements to cells. For example, different pointer structures can be used, e.g., the first pointer can point to the position after the last DSF statement. Different types of status and different ways for checking status information can be used. Further, the statements could be stored in accordance with a logic structure instead of stored physically in a sequential manner. For example, the statements could be organized into groups with the address of each group pointed to by a pointer.

Command lines are sent by one cell to another using a protocol substantially the same as the DSF protocol. Because regular statements section 257 and top priority unction section 264 have different headers, the sending cell can distinguish between these two sections and write to the appropriate section. Other means for identifying these two section can also be used (e.g., maintaining separate linked lists of statements and command lines).

Because DSF statements/commands are executed sequentially (either physically or logically), cell CA needs to complete execution of statements/commands (if any) preceding the above mentioned statements/commands written by cell CS. This set of previously written statements/ commands are likely to be written by other cells (although it is also possible that it is written by cell CS in a prior communication link).

After the set of previously written statements/commands has been executed and prior to the execution of the statements/commands written by cell CS, cell CA does not have to take any action with respect to the cell which wrote the first set of statements/commands (e.g., no "return" is needed). This aspect of the present invention is different from conventional programing architecture.

Note that the communication link between cells CA and CS can be terminated prior to the execution of the first statement/command sent by cell CS (for example, the previously written DSF statements commands have not yet be executed completely when cell CS finishes sending DSF statements to cell CA). This is different from conventional linking in which communication link between two program modules is completed only after the task relating to these two modules is executed completely.

In a different embodiment of top priority function section 264, command lines section 268 allows only one command. In this embodiment, there is no need to have pointers. Thus, condition section 266 can be removed from top priority function section 264. Other cells can write a single command to top priority function section 264 because this section is separated from other sections by a header.

Figure 7:
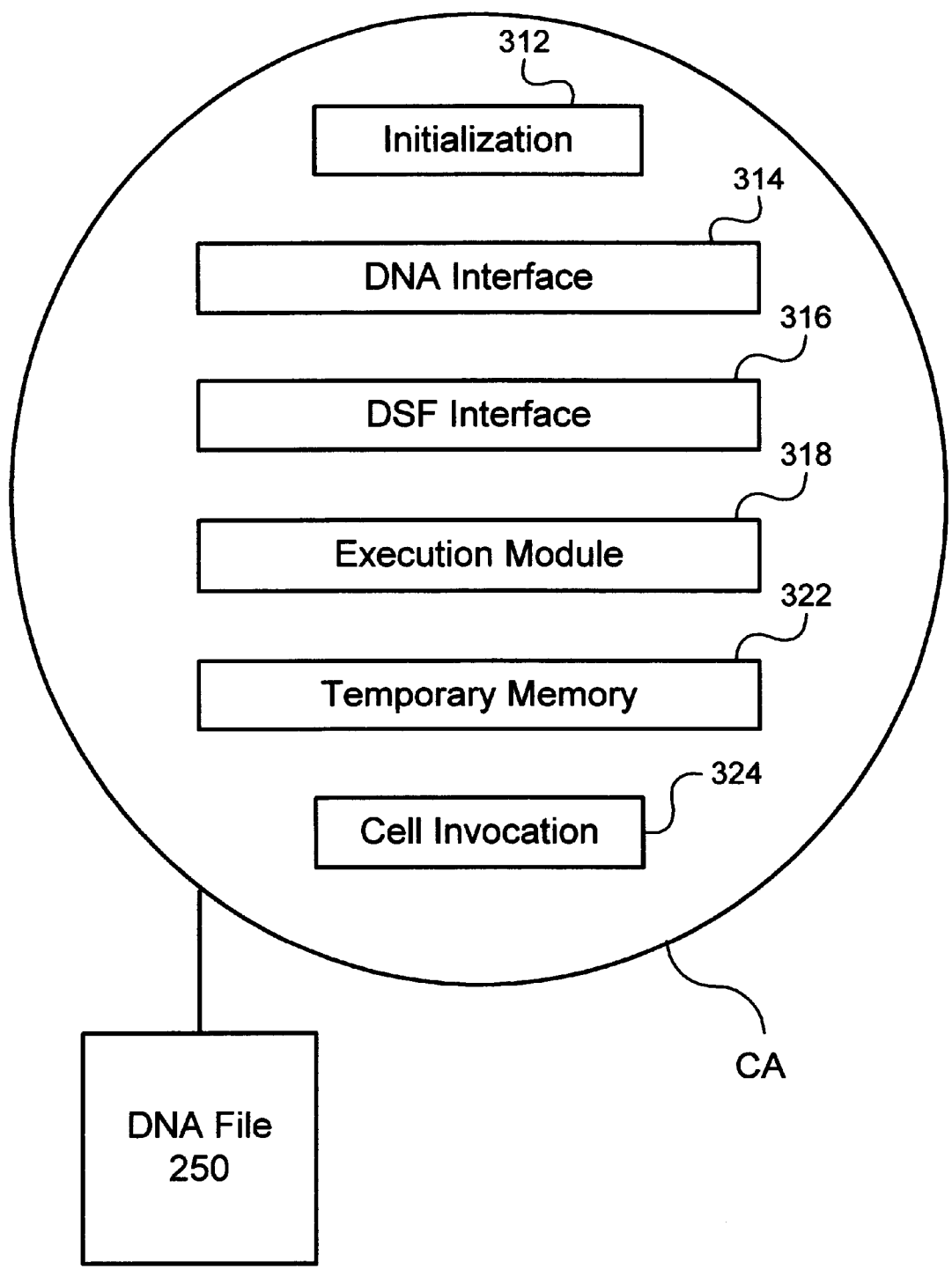
FIG. 7 is a block diagram of the logical structure of a cell of the present invention.

FIG. 7 shows the structure of cell CA. It is grouped logically into a plurality of sections, each implemented using instructions executable by a computer. Cell CA contains an initialization section 312 and a DNA interface section 314. DNA interface section 314 allows cell CA to read from and write to its corresponding DNA file 250. Initialization section 312 takes care of housekeeping tasks when invoked, including reading parameters from "own parameters" section 252 of DNA file 250. Cell CA also contains a section 316 for processing DSF protocol. This section contains code (or program instructions) for sending and receiving statements/command lines using the DSF protocol.

Cell CA contains an execution section 318 containing code for automatically executing statements and command lines in DNA file 250 written by other cells. The code sequentially read and execute statements in statements section 260 of DNA file 250. After each statement is executed, cell CA branch to top priority function section 259 and executes all the command lines therein. Cell CA then executes the next statement in statement section 260.

An example is used to illustrate the execution steps. In this example, statements section 260 contains two statements, "Draw Circle" and "Draw line," while the top priority function section 259 contains one command line, "Max". When cell CA reads a "Draw Circle" statement and its associated parameters, the code will perform a graphic algorithm for drawing a circle at an appropriate place with an assigned diameter (as determined by the associated parameters). Cell CA then branches to top priority function section 259 and executes the "Max" command, which causes a window associated with cell CA to enlarge. Cell CA returns to statements section 260 and executes the next statement, i.e., the "Draw Line" statement. Cell CA executes a graphic algorithm which draws a line in accordance with the parameters associated with the "Draw Line" statement.

In the above example, if the command line in top priority function section 259 contains a "Close" command, cell CA will close itself. In this situation, the "Draw Line" statement will not be executed.

In one embodiment of the present invention, cell CA reads statements section 260 at predetermined times regardless whether statements are present in DNA file 250 (i.e., similar to a polling arrangement). In another embodiment of the present invention, a cell sends a signal to cell CA, either directly or indirectly (e.g., through an operating system), after sending statements to DNA file 250. Upon receiving the signal, cell CA executes the statements in statements section 260 until all the statements have been executed. Cell CA then waits for another signal. This embodiment is similar to an interrupt arrangement. Thus, the execution of statements is carried out automatically in both embodiments.

Cell CA contains a temporary memory section 322 for storing temporary information. As an example, it is possible to change attributes (e.g., background color and the size of the display window) of cell CA during its execution. In one embodiment of the present invention, the changed attributes are temporarily stored in temporary memory section 322 instead of immediately being written to DNA file 250. In tis embodiment of cell CA, the attribute information stored in temporary memory section 322 is written into "own parameters" section 252 of DNA file 250 only when cell CA is terminated.

Cell CA also contains a cell invocation section 324 for involving other cells. In one embodiment of the present invention, this section obtains information about the cell desired to be invoked and pass this information to a specialized cell which actually invoke the desired cell. It is also possible to incorporate the functionality of this specialized cell in the cell invocation section of cell CA and other cells.

It should be appreciated that the above mentioned sections in cell CA are grouped logically, and portions of these sections could intermingle physically.

It can be seen from the above described structures of cell CA and its associated DNA file 250 that both cell CA and DNA file 250 do not keep track of the origin of the DSF statements. A cell may accept DSF statements (stored in its associated DNA file) from many cells. Alter the DSF statements have been received, the linkage between the originating and destination cells is terminated. The cell executes DSF statements contained in its associated DNA file without knowledge of how the statements arrive the DNA file. As a result, there is no need to "return" to any cell. As pointed out above in connection with the destination file, nothing in this architecture prevents the recipient cell from returning information to the originating cell.

Typically, the size of each cell is small and the function of the cell well defined. Consequently, the execution speed is fast. As a result of the small size and specialized function, the cells can be easily written to fully utilize the resources of a computer. The communication between cells using DSF is direct, with minimum amount of access to the operating system on which an application is run. As a result, the efficiency is high.

The architecture of the digital cell technology comprises at least two cells which can communicate with each other. The cells are encapsulated program modules that are specialized for their designed tasks. Therefore, applications developed using the present architecture comprise of multiple executables which can run independently or concurrently. The cells interact with each other using the inventive DSF protocol. Each cell can control the action of other cells. For example, a first cell can control a second cell, and the second cell can control the first cell. Therefore, no single cell has complete control over the other cells, or in other words, there is no boss. On the other hand, under conventional architectures, program modules subordinate to a boss cannot control the boss. Another unique characteristic of the present architecture is that the cell that receives a command does not keep any information of where the command came from. This lack of historical knowledge allows cells to move forward instead of going backward in a link.

This technology is called the "digital cell technology" because the structure of program modules and the interaction between them are similar to biological cells. Some of the similarities are listed here: (i) an application is made up of many cells dynamically interacting with each other, (ii) many cells can be active at a time, (iii) the interaction of a pair of cells can be independent of interaction of other pairs of cells, (iv) control is distributed instead of centralized, and (v) each cell is associated with a DNA structure which guides the behavior of the cell.

It can be seen from above that the digital cell technology is especially suitable for implementing the database system of the present invention. This database system comprises many database drivers, only a few of them may be used at a time. If they are implemented using conventional computer program architecture, the software could be too big and too slow. Under the digital cell technology, all the drivers are implemented independently (instead of subroutines, as is the case in conventional architecture). Only those drivers that are actually being used are active. As a result, there is little, if any, reduction in performance by adding more drivers (and their associated databases) to the system.

One of the embodiments of the present invention is an application development system which runs under MICROSOFT's MS WINDOWS™. In this environment, cells are programs stored as "EXE" files and typically show a window on a computer monitor when invoked. By linking these cells, a user can construct an application software just like assembling blocks. Each cell, with its specific function, is given another function or value through DSF protocol with other cells to produce a variety of applications.

Figure 8:
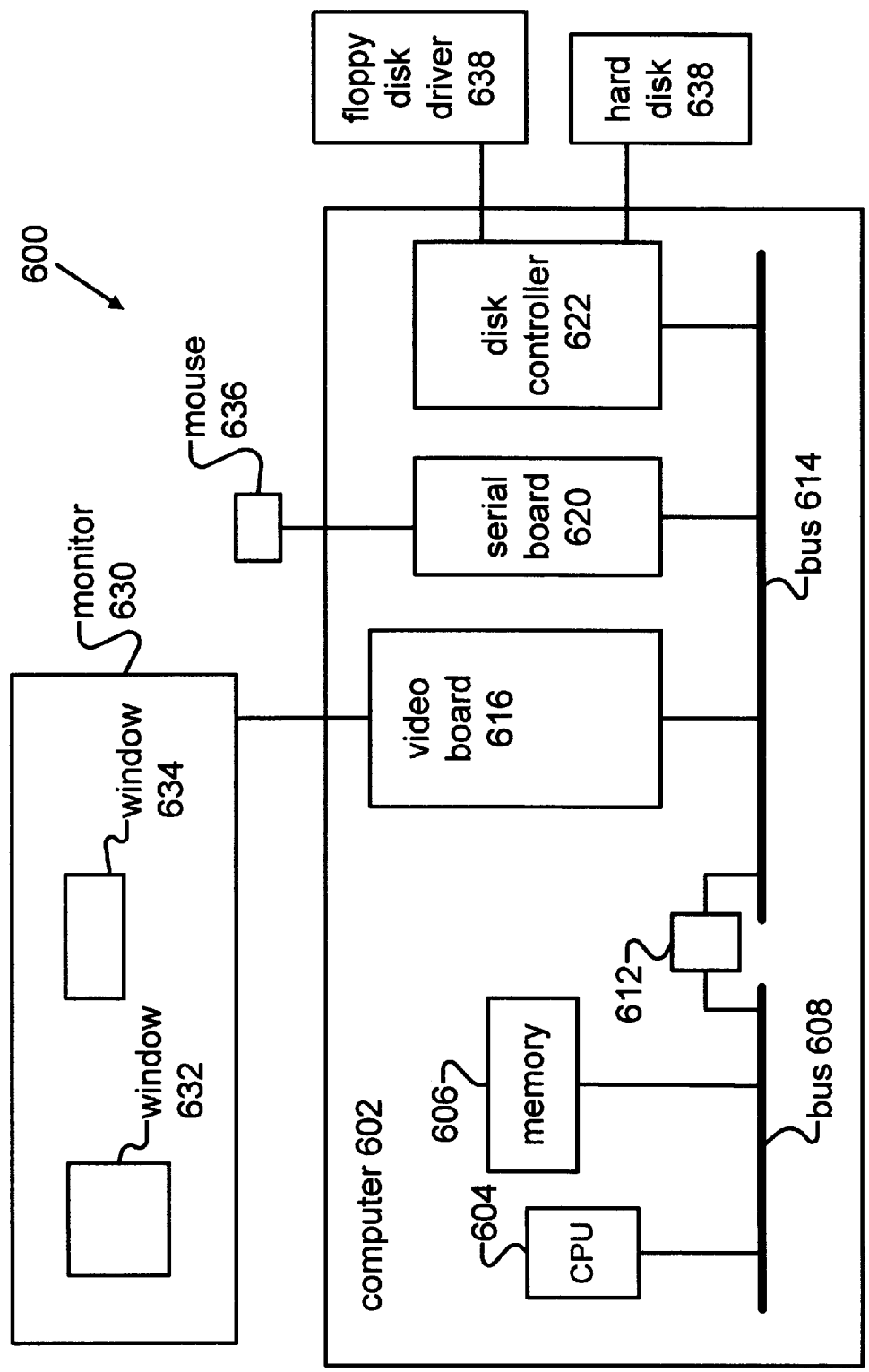
FIG. 8 is a block diagram of a computer system which can be used to run the database system of the present invention.

FIG. 8 shows a block diagram of a computer system 600 which can be used to run the database system of the present invention. Computer system 600 comprises a computer 602 having a central processing unit (CPU) 604 and system memory 606, which could be random access memory (RAM) or read-only memory (ROM), coupled to a system bus 608. Computer 602 also contains a peripheral bus controller 612 for controlling a peripheral bus 614. Depending on the architecture of computer 602, peripheral bus 614 could be a PCI bus, VESI local bus, ISA bus, or other similar buses. Peripheral bus 614 allows peripheral boards to be connected to computer 602. Examples of peripheral boards are a video board 616, a serial board 620 and a data transfer board 622. CPU 604 and RAM 606 can communicate with the peripheral boards through peripheral bus controller 612.

Serial board 620 allows serial communication between computer 602 and one or more external serial devices, such as a mouse 636.

Video board 616 contains circuits to control a monitor 630 and display images thereon. Video board 616 also contains memory (not shown) associated with such display. The memory is preferably a special kind of memory integrated circuit device, called video RAM (VRAM), designed for video applications. The circuits draws images on monitor 630 based on information stored in the memory. The images are on monitor 630 are updated at predetermined time intervals. An example of an image is display 740 shown in FIG. 2A.

If computer system 600 is used to run programs in a windows-based environment, one or more windows, such as a windows 632 and 634, could be displayed on monitor 630.

Disk controller board 622 is connected to a hard disk 638 and a floppy disk driver 638. The MS Window and the operating system are generally stored in hard disk 638. The cells can be stored in floppy diskettes and downloaded into hard disk 638. In one embodiment of the present invention, individual database driver and its associated database can be designed and stored in diskette. These diskettes can be distributed to end users. The diskettes can be loaded into hard disk 638. If other cells want to use one or more of these databases, the cells can invoke the corresponding drivers (i.e., cells). Alternatively, these new drivers can also invoke other cells.

The invention has been described with reference to a specific exemplary embodiment thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A network database system including a plurality of computers coupled to a network, comprising:

a first database data base having two columns only and a plurality of rows;

a first database software driver designed to perform searches on said first database;

a second database having two columns only and a plurality of rows;

a second database software driver designed to perform searches on said second database;

said first database, said second database, said first database driver and said second database driver may reside on different computers on said network;

means for downloading said first database, said second database, said first database driver and said second database driver to a selected computer on said network, if said first database, said second database, said first database driver and said second database driver are not already residing on said selected computer; and a software module on said selected computer for interacting with said first and said second drivers to achieve a desired search result.

2. The network database system of claim 1 wherein said network is the Internet.

3. A method for searching data in a database system, comprising:

providing at least a first and a second database;

providing a first and a second database driver associated with said first and said second databases, respectively, said first and said second database drivers being designed to perform searches on said first and said second databases, respectively, said first and said second database drivers having a first and a second parameter file, respectively;

providing a software module interacting with said first and said second drivers to achieve a desired search result;

sending a first search instruction to said first parameter file by said software module;

searching said first database by said first database driver in accordance with said first search instruction to generate a first search result;

sending a second search instruction to said second parameter file by said software module;

searching said second database by said second database driver in accordance with said second search instruction to generate a second search result; and combining said first and said second search results by said software module to obtain a desired search result.

4. The database system of claim 3 wherein said first and said second databases each having two columns only and a plurality of rows.

5. The database system of claim 3 wherein said first database comprises pairs of ASCII characters separated by a predetermined association symbol.

6. A database system comprising:

at least a first database and a second database;

a first and a second database software driver associated with said first and said second databases, respectively;

said first database driver containing a first parameter file and being designed to perform searches on said first database;

said second database driver containing a second parameter file and being designed to perform searches on said second database;

said first database driver containing means for sending a first command to said second parameter file;

said second database driver containing means for sending a second command to said first parameter file;

said first database driver containing means for executing said second command without returning result of execution to said second database driver; and said second database driver containing means for executing said first command without returning result of execution to said first database driver; and a software module for interacting with said first and said second drivers to achieve a desired search result.

7. The database system of claim 6 wherein said first and said second databases each having two columns only and a plurality of rows.

8. The database system of claim 6 wherein said first database comprises pairs of ASCII characters separated by a predetermined association symbol.

9. The database system of claim 6 wherein said searches on said first and said second databases include a logic operation on data in said databases.

10. The database system of claim 6 wherein said software module causing said first and said second database drivers to perform searches on their respective databases and combining results of said searches to achieve said desired search result.

11. A network database system including a plurality of computers coupled to a network, comprising:

a first database and a second database;

a first database software driver designed to perform searches on said first database, said first database software driver containing a first parameter file;

a second database software driver designed to perform searches on said second database, said second database software driver containing a second parameter file;

said first database, said second database, said first database software driver and said second database software driver may reside on different computers on said network;

means for downloading said first database, said second database, said first database driver and said second database driver to a selected computer on said network, if said first database, said second database, said first database driver and said second database driver are not already residing on said selected computer;

said first database driver containing means for sending a first command to said second parameter file;

said second database driver containing means for sending a second command to said first parameter file;

said first database driver containing means for executing said second command without returning result of execution to said second database driver;

said second database driver containing means for executing said first command without returning result of execution to said first database driver; and a software module on said selected computer for interacting with said first and said second drivers to achieve a desired search result.

12. The database system of claim 11 wherein said first and said second databases each having two columns only and a plurality of rows.

13. The network database system of claim 11 wherein said network is the Internet.

* * * * *